United States Patent
Staninger et al.

(10) Patent No.: US 10,424,182 B1
(45) Date of Patent: Sep. 24, 2019

(54) CHILD IN VEHICLE DETECTOR

(71) Applicant: Ancer, LLC, Winter Haven, FL (US)

(72) Inventors: Carol Staninger, Winter Haven, FL (US); Andrew W. Oravecz, Safety Harbor, FL (US); John Head, III, Largo, FL (US); Richard Paul Spehr, Largo, FL (US); Suzanne Spehr, Largo, FL (US)

(73) Assignee: Ancer, LLC, Winter Haven, FL (US)

( * ) Notice: Subject to any disclaimer, the term of this patent is extended or adjusted under 35 U.S.C. 154(b) by 0 days.

(21) Appl. No.: 16/192,276

(22) Filed: Nov. 15, 2018

Related U.S. Application Data

(63) Continuation-in-part of application No. 15/910,058, filed on Mar. 2, 2018, now abandoned.

(51) Int. Cl.
G08B 21/22 (2006.01)
G08B 21/24 (2006.01)
G08B 21/02 (2006.01)
B60N 2/00 (2006.01)

(52) U.S. Cl.
CPC ......... *G08B 21/22* (2013.01); *G08B 21/0269* (2013.01); *G08B 21/24* (2013.01); *B60N 2/002* (2013.01); *G08B 21/0277* (2013.01)

(58) Field of Classification Search
CPC .... G08B 21/22; G08B 21/0269; G08B 21/24; G08B 21/0277; B60N 2/002
See application file for complete search history.

(56) References Cited

U.S. PATENT DOCUMENTS

| 6,130,614 | A | 10/2000 | Miller |
| 6,736,231 | B2 | 5/2004 | Breed |
| 6,922,622 | B2 | 7/2005 | Dulin |
| 7,036,390 | B2 | 5/2006 | Tsuchihashi |
| 7,097,226 | B2 | 8/2006 | Bingle |
| 7,109,853 | B1 | 9/2006 | Mattson |
| 7,321,306 | B2 | 1/2008 | Lee |
| 8,058,983 | B1 | 11/2011 | Davisson et al. |
| 9,569,948 | B1 | 2/2017 | Platt |
| 2002/0080014 | A1 | 6/2002 | McCarthy et al. |

(Continued)

FOREIGN PATENT DOCUMENTS

| CA | 2849684 | 10/2015 |
| WO | 0247942 | 6/2002 |

(Continued)

*Primary Examiner* — Ryan W Sherwin
(74) *Attorney, Agent, or Firm* — Larson & Larson, P.A.; Frank Liebenow; Justin P. Miller

(57) ABSTRACT

A device for detecting a being left within a vehicle includes a sensor that detects when a being (e.g. a pet, a child, etc.) is within a vehicle and the operator of the vehicle has moved away from the vehicle by more than, for example five feet. Upon detection of such, the device emits a sound to notify others nearby of the being that was left within the vehicle. The sound is preferably different than a sound of a typical vehicle theft alarm system. In a preferred embodiment, determination that the operator has left the vehicle is by a loss of a signal from a personal transmitter that is attached to the operator's key ring or worn by the operator. After moving away from the vehicle by more than five feet, the signal from the personal transmitter decreases and initiates determination if a being remains within the vehicle.

19 Claims, 12 Drawing Sheets

(56) References Cited

U.S. PATENT DOCUMENTS

| | | |
|---|---|---|
| 2006/0103516 A1 | 5/2006 | Zang |
| 2009/0079557 A1* | 3/2009 | Miner ............... B60N 2/002 |
| | | 340/457.1 |
| 2013/0145482 A1* | 6/2013 | Ricci ............... H04W 4/90 |
| | | 726/28 |
| 2017/0036541 A1 | 2/2017 | Brankovic |
| 2017/0039835 A1 | 2/2017 | Brankovic |
| 2017/0106789 A1 | 4/2017 | Holdbrook-Smith |
| 2017/0116839 A1 | 4/2017 | Friedman |
| 2018/0065504 A1 | 3/2018 | Lan et al. |
| 2018/0096578 A1 | 4/2018 | Mattarocci |

FOREIGN PATENT DOCUMENTS

| | | |
|---|---|---|
| WO | 2004001695 | 12/2003 |
| WO | 2015140333 | 9/2015 |
| WO | 2016007547 | 1/2016 |

* cited by examiner

CHILD IN VEHICLE DETECTOR

CROSS-REFERENCE TO RELATED APPLICATION

This application is a continuation in part of U.S. patent application Ser. No. 15/910,058, filed Mar. 2, 2018, the disclosure of which is hereby incorporated by reference.

FIELD

This invention relates to the field of safety and more particularly to a system for detecting a life form within a vehicle and sounding an alert when such life form is left alone in the vehicle.

BACKGROUND

Reading the news, especially in extreme heat or extreme cold, there is often a story about a child, a baby, a pet, or a person with a disability; left in a vehicle by a parent/owner/guardian. This person or pet didn't survive, dying from overheating or freezing in a terrible way. The parent/owner/guardian returning to the vehicle and finding such is devastated. The whole community is devastated. The parent/owner/guardian is sometimes subject to criminal charges, making it even worse.

There have been many attempts to detect and prevent such occurrences. Many monitor for movement and temperature assuming the temperature exceeds a certain value or falls below a certain value while movement is detected is indicative of a left-behind being, but how do such systems account for the initial time when the vehicle is occupied before the air conditioner or heater brings the temperature within acceptable ranges? How do these systems determine that there is a being (e.g., a child) in the vehicle? Many determine presence of a being by integrating sensors into child seats or into the car seats to detect the weight of the being/child. These types of detectors require complicated installation and, after time, are prone to failure as detector switches often fail due to buildup on contacts of spring failure, especially when children spill food and drink on the car seats. Further, the sensitivity of such weight detector switches often does not have the range to detect a 60 pound child as well as a 5 pound premature child. Further, small pets are often unable to be detected by seat-mounted pressure sensing switches as pets do not like to be constrained and often run freely in the back of a vehicle.

What is needed is a vehicle safety system that will determine when an operator of a vehicle vacates the vehicle while a being (e.g. a child) remains in the vehicle.

SUMMARY

A vehicle safety system includes a device for detecting a being left within a vehicle includes a sensor that detects when a being (e.g. a pet, a child, etc.) is within a vehicle and, concurrently, the operator of the vehicle has left the vehicle. Upon detection of such, the device for detecting a being left within a vehicle emits a sound to notify others nearby of the being that was left within the vehicle. The sound is preferably different than a sound of a typical vehicle theft alarm system. In one embodiment, the sound is in the cadence/pattern of the international distress call in Morse code (dot, dot, dot, dash, dash, dash, dot, dot, dot; or three short beeps followed by three long beeps, followed by three short beeps). In a preferred embodiment, it is determined that the operator has left the vehicle by a loss of a signal from a key-fob that is attached to the operator's key ring so that, after moving a predetermined distance from the vehicle (e.g. a distance of at least five feet), this loss of signal from the key-fob initiates determining if a being remains within the vehicle and, if so, sounding of the alarm.

In one embodiment, a vehicle safety system is disclosed having a device for detecting that an operator of the vehicle is away from the vehicle by more than a predetermined distance (e.g. greater than five feet), a device for detecting movement within a passenger compartment of the vehicle, and a device for signaling an alarm. The device for detecting movement within a passenger compartment is partially shielded by a partial Faraday shield to prevent false alarms due to people/animals near the vehicle. Responsive to the device for detecting the operator of the vehicle is away from the vehicle by more than the predetermined distance (e.g. five feet), the device for detecting movement within the passenger compartment of the vehicle scans the vehicle to determine if there is the movement within the vehicle. If there is the movement within the vehicle, the device for signaling the alarm is activated to signal the alarm.

In another embodiment, vehicle safety system is disclosed including a personal transmitter that periodically emits a radio frequency signal of a power level. An enclosure is mounted within a passenger compartment of a vehicle. A receiver is located within the enclosure. The receiver receives and detecting the radio frequency signal as long as the personal transmitter is within a predetermined distance of an antenna of the receiver, for example, within five feet of an antenna of the receiver. A movement detector is also located within the enclosure and is partially shielded to prevent false alarms. The receiver attempts to detect the radio frequency signal for a period of time and, responsive to the receiver not detecting the radio frequency signal for the period of time, the movement detector is operated to determine if there is movement within the vehicle. If there is the movement within the vehicle, an alarm is signaled.

In another embodiment, a method of vehicle safety is disclosed including, (a) within a vehicle, attempting to receive a radio frequency signal from a personal transmitter; (b) if not receiving the radio frequency signal within a predetermined period of time, (c) determining if there is movement within the vehicle and (d) if there is movement within the vehicle, sounding an alarm then (e) waiting until a reset is received, at which time, (f) stopping of the sounding of the alarm. (g) repeating steps (a)-(f).

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
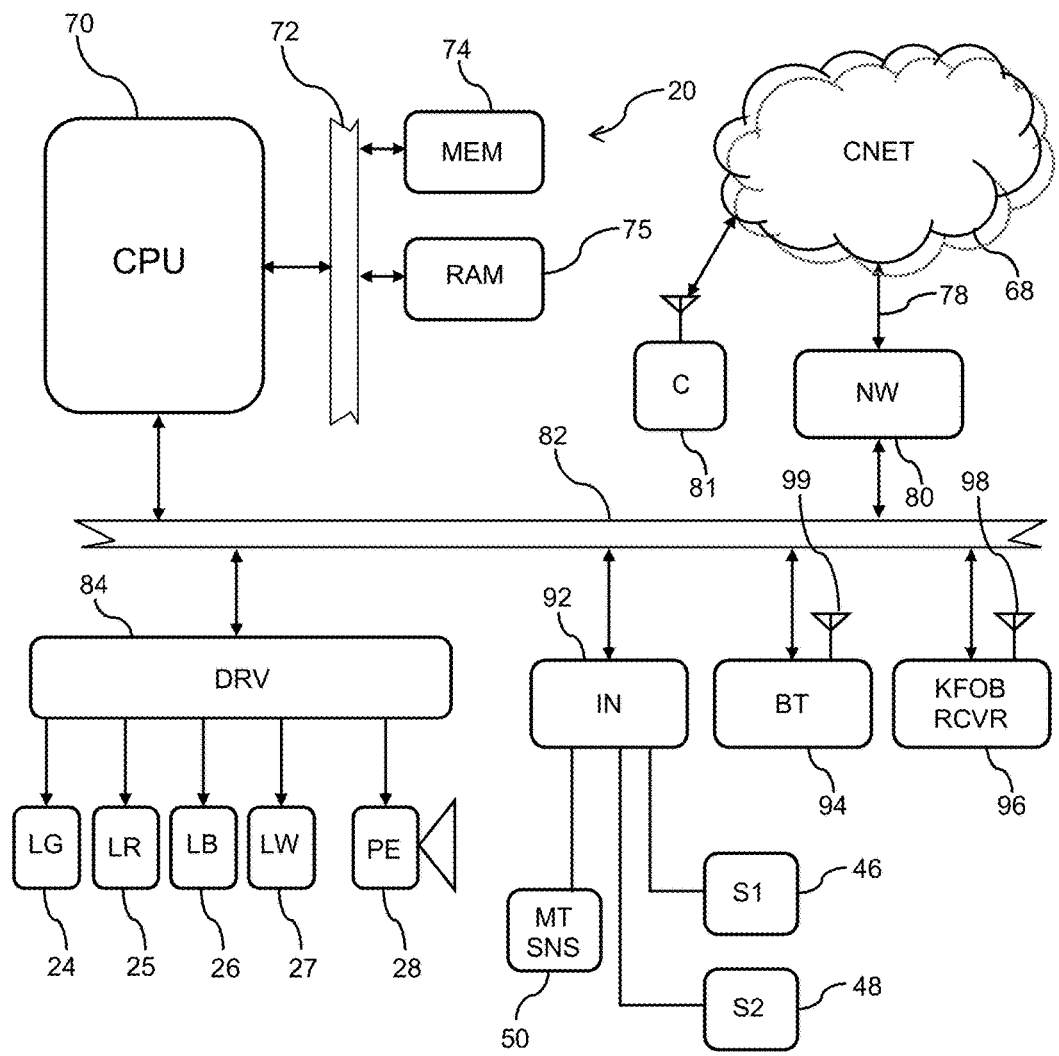
FIG. 1 illustrates a block diagram of a processor-based device for detecting a being left within a vehicle.

Reference will now be made in detail to the presently preferred embodiments of the invention, examples of which are illustrated in the accompanying drawings. Throughout the following detailed description, the same reference numerals refer to the same elements in all figures.

Throughout this description, a device 10 for detecting a being left in a vehicle 9 is described. The "being" is, for example, a person, child, pet, animal, or anything that breathes.

Referring to FIG. 1, a schematic view of the device 10 for detecting a being left within a vehicle 9 (see FIG. 10) utilizing a processor 70 is shown. The device 10 for detecting a being left within a vehicle 9 includes the processor subsystem 20, a personal transmitter 100, and a sound emitting device 30.

The exemplary device 10 for detecting a being left within a vehicle 9, is shown as utilizing a processor 70, though it is known in the industry to utilize logic in place of processors and vice versa. An exemplary processor subsystem 20 is shown in its simplest form. Different architectures are known that accomplish similar results in a similar fashion and the device 10 for detecting a being left within a vehicle 9 is not limited in any way to any particular system architecture or implementation. In this exemplary processor subsystem 20, a processor 70 executes or runs programs from a random-access memory 75. The programs are generally stored within a persistent memory 74 and loaded into the random-access memory 75 when needed. The processor 70 is any processor, typically a processor designed for portable devices. The persistent memory 74 and random-access memory 75 interface through, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, magnetic memory, etc. In some examples, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as output drivers 84 and input ports 92. The input ports 92 receive data and signals such as inputs from control switches 46/48 and status of the being detection module 50. The output drivers 84 receive commands from the processor 70 and control, for example, optional LEDs 24/25/26/27 and optional piezo sounder 28.

One of the inputs to the input ports 92, and hence the processor 70, is from the being detection module 50 which is a movement detector for sensing movement within the passenger compartment of the vehicle 9. The being detection module 50 determines when a being is within the vehicle, as will be described. In some embodiments, communication with the being detection module 50 is a simple on/off signal (e.g. a being is present or a being is absent), while in other embodiments, there is a protocol between the processor 70 and the being detection module 50.

The being detection module 50 is a device that detects the presence of a being within the passenger compartment of a vehicle 9. Although there are infra-red technologies that have been successfully used for alarm systems, and are also included here within as one form of a being detection module 50, it is preferred that the being detection module 50 sense or detect movement of an occupant down to a level of chest movement during breathing. This is important as many small children often fall asleep during a drive and, being asleep, an infra-red sensor is not triggered, as movement is required for such. Therefore, the preferred being detection module 50 has mechanisms for detecting movement down to millimeter movements (e.g. less than one millimeter of movement).

It has been determined and tested that the preferred being detection module 50 utilizes a pulsed radar transducer that detects sub-millimeter movement. One example of this sensor is the Xethru X4 from Novelda Corporation. This detection module 50 utilizes ultra wide band (UWB) impulse radar transceiver to detect presence of a being within a vehicle. Although the being detection module 50 is not restricted to any particular frequency of operation, the disclosed being detection module 50 operates at sub-10 GHz frequencies. The disclosed being detection module 50 detects movement through obstacles such as clothing, even minute chest movements of a child during breathing. The being detection module 50 includes an impulse radar transceiver that has a 7.29/8.748 GHz transmitter, a direct RF-sampling receiver, and a controller.

In some embodiments, the device 10 for detecting a being left within a vehicle 9 utilizes standard local area communication protocols such as a Bluetooth transceiver 94 or a Wi-Fi radio transceiver (not shown for clarity reasons). In the examples shown, the device 10 for detecting a being left within a vehicle 9 utilizes wireless data communications between the Bluetooth transceiver 94 and external devices for signaling an alarm. For example, in some embodiments, the device 10 for detecting a being left within a vehicle 9 signals a sound emitting device 30 (see FIGS. 3 and 4) to alert people local to the vehicle 9 that a being has been left unattended within the vehicle 9. The sound emitting device 30 is typically a horn.

In some embodiments, the device 10 for detecting a being left within a vehicle 9 utilizes a personal transmitter 100 to determine when the operator of the vehicle is away from the vehicle. The periodic radio frequency transmission (heart beat) coming from the personal transmitter 100 is received on an antenna 98 and detected by a radio receiver 96 that is interfaced to the processor 70, for example, by the system bus 82. In the examples shown, the radio receiver 96 and processor 70 determine that the personal transmitter 100 is away from the vehicle 9 (and hence, the operator 8 is away from the vehicle by, for example, five to ten feet) by determining when the signal strength of the periodic radio frequency transmissions from the personal transmitter 100 falls below a predetermined minimum signal strength for a predetermined period of time. The radio receiver 96 and/or the processor 70 determine if the received radio frequency transmission is from a personal transmitter 100 associated with this device 10 for detecting a being left within a vehicle 9.

As it is anticipated that the device 10 for detecting a being left within a vehicle 9 is installed within existing vehicles, it is desired to make installation simple, not requiring an expert to install the device 10 for detecting a being left within a vehicle 9. In such, it is preferred that the sound emitting device 30 be mounted external to the passenger compartment, for example under the hood of the vehicle. In such, it is desired that there be no wires to attach and, therefore, in some embodiments, the sound emitting device 30 is energized by sending a wireless signal through the wireless interface (e.g. Bluetooth transceiver 94). In such, it is preferred that a "paired" wireless interface (e.g. Bluetooth) be used so that other sound emitting devices 30 that are nearby are not energized when another device 10 for detecting a being left within a vehicle 9 sounds an alarm.

Figure 4:
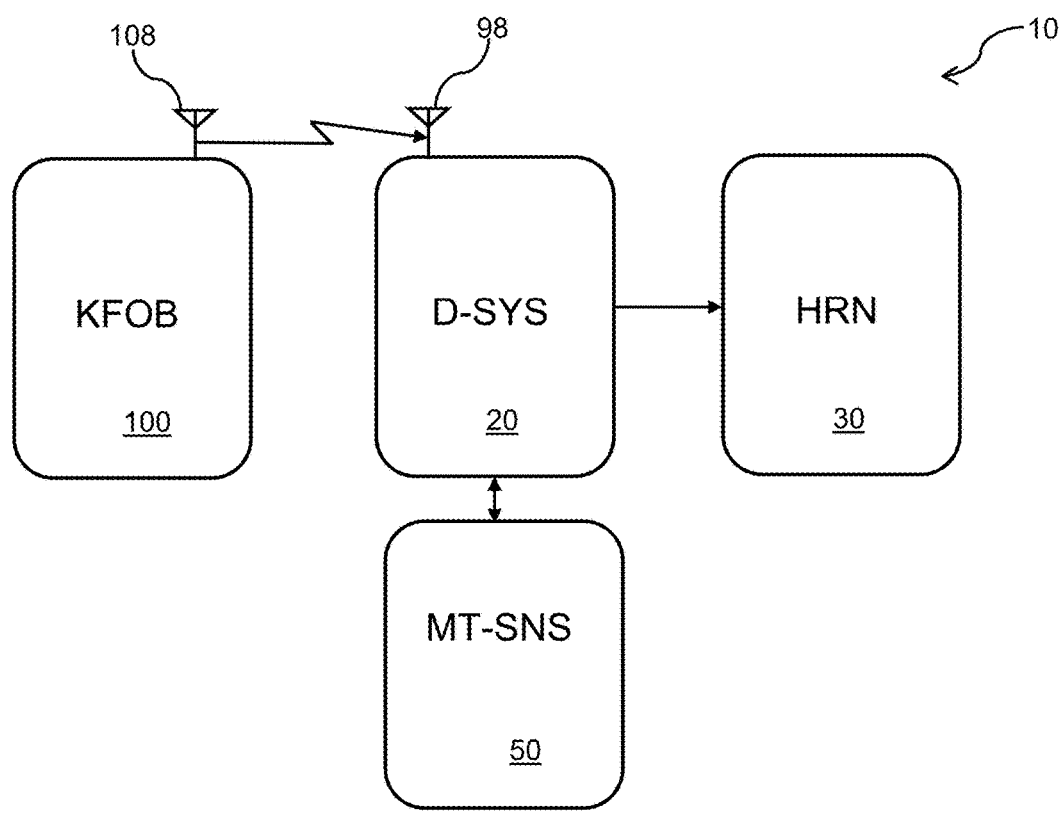
FIG. 4 illustrates a block diagram of the device for detecting a being left within a vehicle with a wired connection to the sounder.

In other embodiments, for example, when the device 10 for detecting a being left within a vehicle 9 is an O.E.M. product that is installed when the vehicle is manufactured, the sound emitting device 30 is interfaced to the device 10 for detecting a being left within a vehicle 9 by a wired connection as shown in FIG. 4.

Vehicle theft alarms are present in many vehicles 9 and are often ignored because of the existence of too many false alarms. Many people walk by a vehicle 9 that is sounding a theft alarm without paying much attention, other than the nuisance that the noise is presenting. For this reason, it is important that the device 10 for detecting a being left within a vehicle 9 only signal an alarm when an actual life-threatening situation is occurring and, when the device 10 for detecting a being left within a vehicle 9 signals an alarm, the sound of the alarm is distinctive so as to not be confused with existing vehicle theft alarms. For this reason, the detection system (as will be shown) is careful not to issue false alarms and, when an alarm is issued, the device 10 for detecting a being left within a vehicle 9 emits a very peculiar sound that does not resemble the sound of the existing theft alarms. The sound that has been selected for a preferred embodiment is a horn sound that emits beeps to the cadence of the international SOS Morse Code signal which is three shorter beeps, followed by three longer beeps, followed by three shorter beeps.

In some embodiments, the device 10 for detecting a being left within a vehicle 9 includes cellular capabilities by way of a cellular network interface 80 that interfaces to the processor 70 by, for example, the system bus 82. The cellular network interface 80 communicates with the cellular network 68 as known in the industry. In this example, a cellular phone 81 is shown connected to the cellular network 68. In some such embodiments, when it is determined that a being remains within the passenger compartment of the vehicle 9 after the operator 8 has vacated the vehicle 9; the cellular network interface 80 is utilized to alert others. For example, a text message is sent to the cellular phone 81 (e.g. the cellular phone 81 belonging to the operator 8), or 911 is dialed and a pre-recorded message is played to the 911 operator (not shown for clarity purposes).

Figure 2:
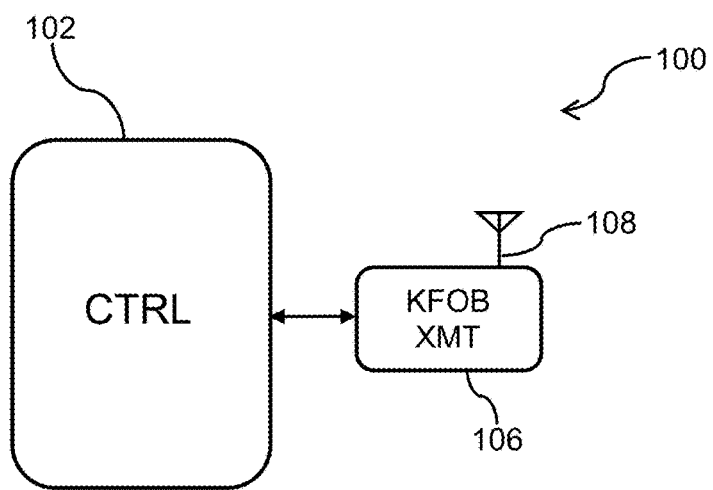
FIG. 2 illustrates a block diagram of a personal transmitter of the device for detecting a being left within a vehicle.

Referring to FIG. 2, a block diagram of a personal transmitter 100 of the device 10 for detecting a being left within a vehicle 9 is shown. In a preferred embodiment, the personal transmitter 100 is a heartbeat transmitter having a control portion 102 that controls a radio frequency transmitter 106 to periodically transmit a radio frequency signal that is emitted from a personal transmitter antenna 108 (e.g. a heartbeat transmission). The signal strength of the radio frequency signal is controlled so that after the personal transmitter 100 is a certain or predetermined distance from the vehicle 9 (for example, five feet), and hence, from the device 10 for detecting a being left within a vehicle 9, a signal strength of this radio frequency signal is lower than a predetermined threshold (or undetectable) or a minimum signal strength, indicating that the operator 8 of the vehicle 9 is further than this certain distance (e.g. five feet) from the vehicle. This distance is important as it needs to be far enough to allow the operator 8 freedom to move around the vehicle and short enough so that, if a child or animal is left in the vehicle 9, the operator 8 is close enough to be able hear the alarm, mute the alarm and save the child or animal. For example, a distance of five to ten feet allows for the operator 8 to exit the vehicle and move a short distance from the vehicle without sounding the alarm (false alarm), for example, when accessing the trunk or pumping gas. Note that vehicle personal transmitters do not have this distance capability as the act of exiting the vehicle causes the vehicle to start signaling loss-of-key messages.

As the radio frequency signal is periodically emitted from the personal transmitter antenna 108, the device 10 for detecting a being left within a vehicle 9 looks for the signal strength of this radio frequency signal being greater than a predetermined threshold (or detectable) or greater than a minimum signal strength at any time during a predetermined period of time. For example, if the radio frequency signal is emitted from the personal transmitter antenna 108 at a period of five seconds (e.g. every five seconds), the device 10 for detecting a being left within a vehicle 9 looks for the signal strength of this radio frequency signal being greater than a predetermined threshold (or detectable) or greater than a minimum signal strength at any time during, for example, a predetermined period of time of ten seconds. Again, the predetermined threshold is set to detect that the device 10 for detecting a being left within a vehicle 9 will not initiate an alarm when the operator 8 is within a reasonable distance from the vehicle 9, for example, five to ten feet.

In some embodiments, the control portion 102 is encoded with a serial number that matches an expected serial number so that the device 10 for detecting a being left within a vehicle 9. The serial number is encoded into the radio frequency signal by the radio frequency transmitter 106 and decoded by the radio receiver 96 and compared to a serial number at the device 10 for detecting a being left within a vehicle 9. If the comparison does not match, then it is determined that the radio frequency is not from a personal transmitter 100 that is assigned to this device 10 for detecting a being left within a vehicle 9 (e.g. to another device 10 for detecting a being left within a vehicle 9).

The above method of determining when the personal transmitter 100 is at this certain distance from the vehicle 9 is preferred due to low cost and robustness, but it is fully anticipated that there are other ways to determine when the personal transmitter 100 is at this certain distance from the vehicle 9, including measuring a round-trip transmission delay of a signal sent from the device 10 for detecting a being left within a vehicle 9 that is repeated by the personal transmitter 100. In such, it is anticipated that the device 10 for detecting a being left within a vehicle 9 transmits a radio frequency signal to the personal transmitter 100 and, after receiving and detecting that signal, the personal transmitter 100 responds to the device 10 for detecting a being left within a vehicle 9. The device 10 for detecting a being left within a vehicle 9 measures the round trip delay of the signal and calculates the distance between the vehicle 9 and the personal transmitter 100 and, if the distance is greater than a predetermined distance (e.g. greater than five fee or greater than ten feet), the device 10 for detecting a being left within a vehicle 9 sounds the sound emitting device 30 (e.g. alarm). In this way, battery drain in the personal transmitter 100 is reduced, as no transmissions are made until the personal transmitter 100 is within range of the vehicle 9.

Other ways are also anticipated, all of which are included here within.

In some embodiments, typically when the device 10 for detecting a being left within a vehicle 9 is designed into a vehicle 9, the vehicle's key fob is utilized as the personal transmitter 100 as many such vehicle electronic key fobs emit an unlock signal that is used by the vehicle to determine when the operator 8 (whoever has the electronic key fob) is in close proximity to the vehicle 9.

Figure 3:
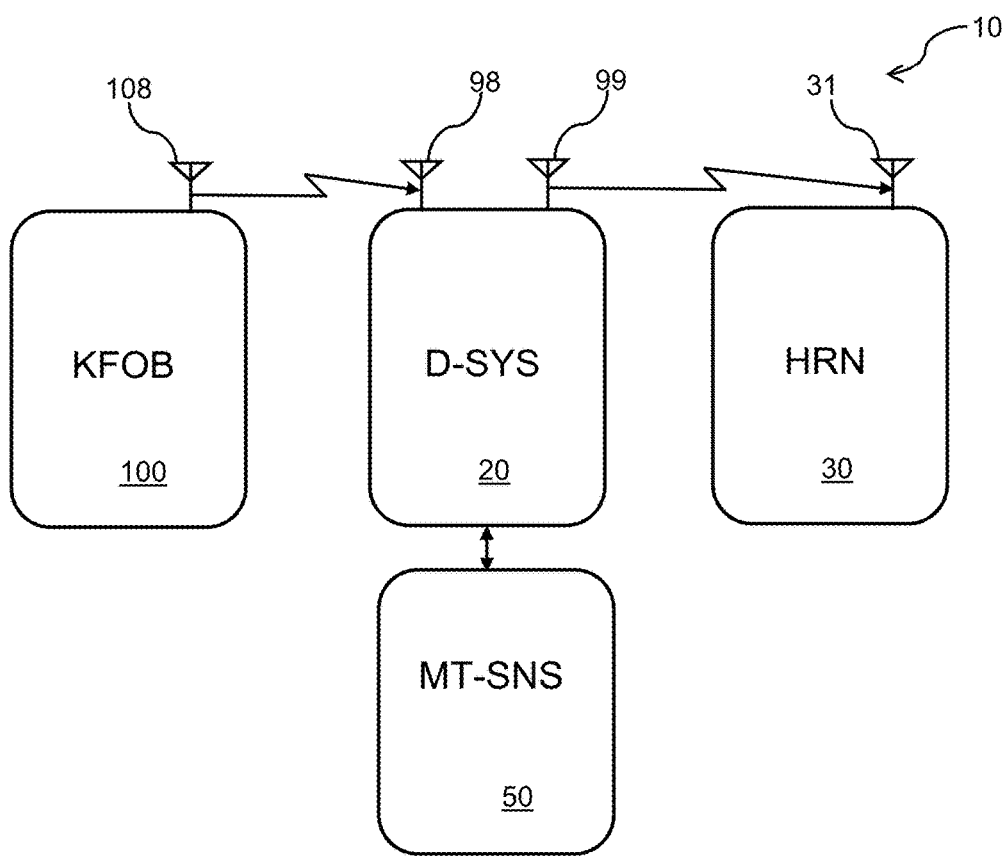
FIG. 3 illustrates a block diagram of the device for detecting a being left within a vehicle with a wireless connection to the sounder.

Referring to FIG. 3, a block diagram of the device 10 for detecting a being left within a vehicle 9 with a wireless connection to the sound emitting device 30 is shown. The above described personal transmitter 100 periodically transmits a radio frequency signal from the personal transmitter antenna 108. When the personal transmitter 100 is within range of the device 10 for detecting a being left within a vehicle 9 (for example five to ten feet), the radio frequency signal is received on a first antenna 98 of the device 10 for detecting a being left within a vehicle 9. As long as this radio frequency signal is received and detected by the device 10 for detecting a being left within a vehicle 9, it is assumed that the operator 8 of the vehicle 9 is in proximity of the vehicle 9. If this radio frequency signal is not received and detected by the device 10 for detecting a being left within a vehicle 9 for a period of time (e.g. a signal strength of the radio frequency at the device 10 for detecting a being left within a vehicle 9 falls below a predetermined threshold or minimum signal strength), it is assumed that the operator 8 of the vehicle 9 has moved far enough away from the vehicle 9 that, if a being remains present in the vehicle 9, that being is likely in danger. To determine if the being is present in the vehicle 9 after the operator 8 has moved away from the vehicle 9, the detection module 50 is initiated to scan the passenger compartment of the vehicle 9 to detect movement as small as chest movement due to breathing. If the detection module 50 detects such movement, the device 10 for detecting a being left within a vehicle 9 transmits another radio frequency signal from a second antenna 99 (it is anticipated that a single antenna be shared as well) to a sounder antenna 31 of the sound emitting device 30. The sound emitting device 30, receiving this second radio frequency signal, emits a sound from, for example, a horn 33 (see FIG. 5). The sound is preferably a loud sound as to attract attention to the potential life-threatening issue at hand.

In some embodiments, the second radio frequency signal is encoded with pairing information such that one device 10 for detecting a being left within a vehicle 9 is uniquely paired with one sound emitting device 30. In the example shown, this pairing is accomplished using industry standard Bluetooth transmissions from the Bluetooth transceiver 94 of the device 10 for detecting a being left within a vehicle 9 to a Bluetooth transceiver 34 of the sound emitting device 30 (see FIG. 5).

In some embodiments, the device 10 for detecting a being left within a vehicle 9 controls the sound emitting device 30 to emit the sound in a unique cadence so that the alarm is distinguishable from an ordinary vehicle alarm. In one such embodiment, the device 10 for detecting a being left within a vehicle 9 controls the sound emitting device 30 to emit the sound in the cadence of the international distress signal (SOS) in Morse code (dot, dot, dot, dash, dash, dash, dot, dot, dot).

In some such embodiments, when it is determined that a being remains within the passenger compartment of the vehicle 9 after the operator 8 has vacated the vehicle 9, in addition to sounding the sound emitting device 30, the cellular network interface 80 is utilized to alert others. For example, a text message is sent to the cellular phone 81 (e.g. the cellular phone 81 belonging to the operator 8), or 911 is dialed and a pre-recorded message is played to the 911 operator (not shown for clarity purposes).

Referring to FIG. 4, a block diagram of the device 10 for detecting a being left within a vehicle 9 with a wired connection to the sound emitting device 30 is shown. As described with FIG. 3, the above described personal transmitter 100 periodically transmits a radio frequency signal from the personal transmitter antenna 108. When the personal transmitter 100 is within range of the device 10 for detecting a being left within a vehicle 9, the radio frequency signal is received on a first antenna 98 of the device 10 for detecting a being left within a vehicle 9. As long as this radio frequency signal is received and detected by the device 10 for detecting a being left within a vehicle 9, it is assumed that the operator 8 of the vehicle 9 is in proximity of the vehicle 9. If this radio frequency signal is not received and detected by the device 10 for detecting a being left within a vehicle 9 for a period of time, it is assumed that the operator 8 of the vehicle 9 has moved far enough away from the vehicle 9 that, if a being remains present in the vehicle 9, that being is likely in danger. To determine if the being is present in the vehicle 9 after the operator 8 has moved away from the vehicle 9, the detection module 50 is initiated to scan the passenger compartment of the vehicle 9 to detect movement as small as chest movement due to breathing. If the detection module 50 detects such movement, the device 10 for detecting a being left within a vehicle 9 directly controls the sound emitting device 30. Responsive to such, the sound emitting device 30 emits a sound from, for example, a horn 33 (see FIG. 5). The sound is preferably a loud sound as to attract attention to the potential life-threatening issue at hand.

In some embodiments, the device 10 for detecting a being left within a vehicle 9 controls the sound emitting device 30 to emit the sound in a unique cadence so that the alarm is distinguishable from an ordinary vehicle alarm. In one such embodiment, the device 10 for detecting a being left within a vehicle 9 controls the sound emitting device 30 to emit the sound in the cadence of the international distress signal (SOS) in Morse code (dot, dot, dot, dash, dash, dash, dot, dot, dot).

Again, in some such embodiments, when it is determined that a being remains within the passenger compartment of the vehicle 9 after the operator 8 has vacated the vehicle 9, in addition to sounding the sound emitting device 30, the cellular network interface 80 is utilized to alert others. For example, a text message is sent to the cellular phone 81 (e.g. the cellular phone 81 belonging to the operator 8), or 911 is dialed and a pre-recorded message is played to the 911 operator (not shown for clarity purposes).

Figure 5:
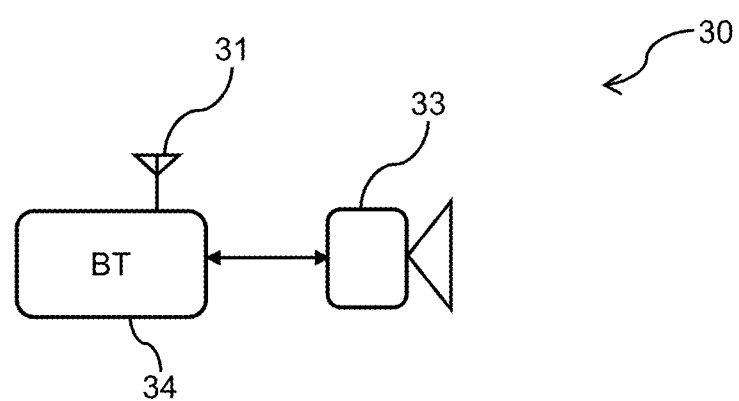
FIG. 5 illustrates a block diagram of the sounder of the device for detecting a being left within a vehicle.

Referring to FIG. 5, a block diagram of the sound emitting device 30 of the device 10 for detecting a being left within a vehicle 9 is shown. In this example, the sound emitting device 30 has a Bluetooth transceiver 34 that is paired with the Bluetooth transceiver 94 of the device 10 for detecting a being left within a vehicle 9. Upon receiving a signal from the Bluetooth transceiver 94 of the device 10 for detecting a being left within a vehicle 9, a sound emitting device (e.g.

a horn 33) is instructed to emit sound, preferably a loud sound. It is anticipated that the device 10 for detecting a being left within a vehicle 9 is mounted within the passenger compartment of the vehicle 9 while the sound emitting device 30 is mounted at a location of the vehicle 9 that is external to the passenger compartment, for example, in the engine compartment of the vehicle 9.

Figure 6:
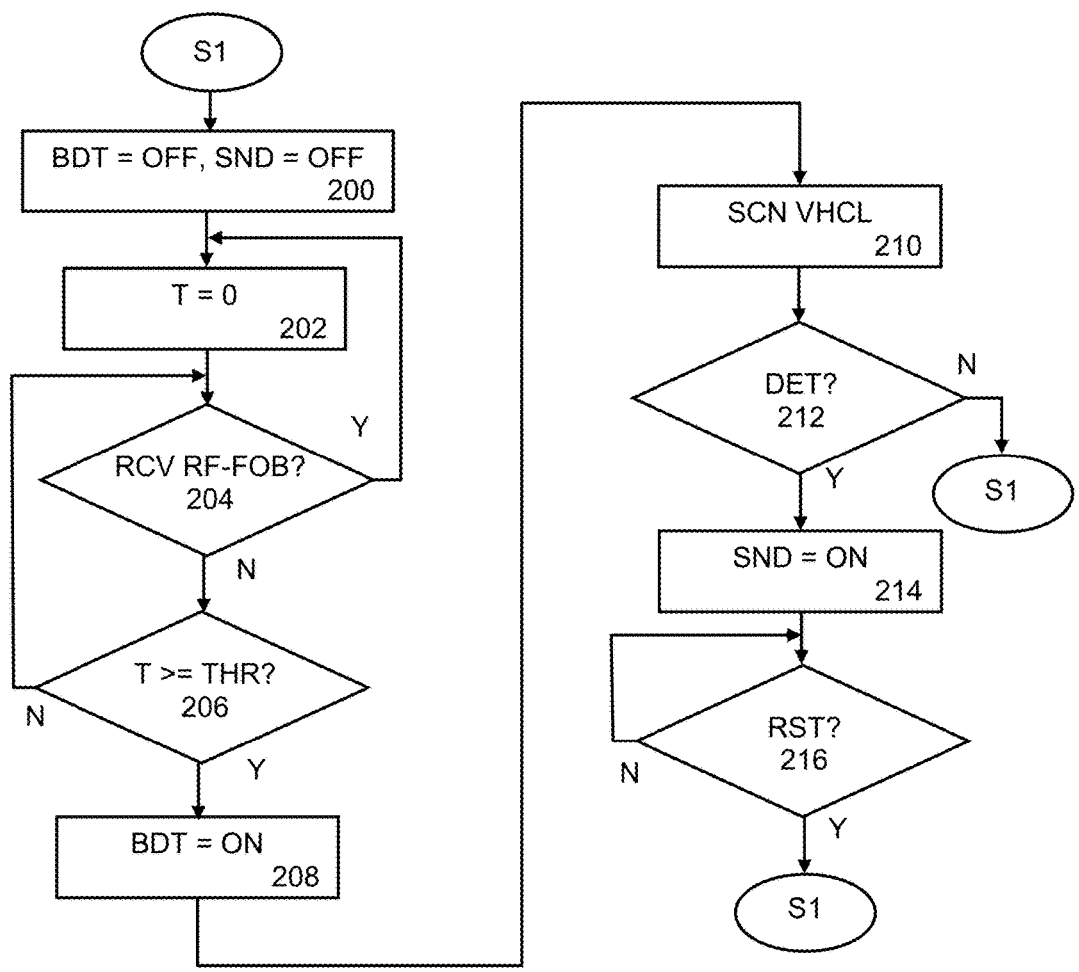
FIG. 6 illustrates a flow chart of the device for detecting a being left within a vehicle.

Referring to FIG. 6, a flow chart of the device 10 for detecting a being left within a vehicle 9 is shown. As with any processor-based device, it is fully anticipated that equivalent functionality be fabricated utilizing discrete logic. The flow shown in FIG. 6 is an exemplary flow of software that runs on the processor 70 and it is fully anticipated that other similar or equivalent program flows will produce the same or similar results.

The software flow starts with a step for turning off 200 the being detection module 50 and the sound emitting device 30. As power conservation is important in the device 10 for detecting a being left within a vehicle 9, especially when battery powered, the being detection module 50 is only powered when needed. The sounder is turned off for obvious reasons.

As the personal transmitter 100 emits radio frequency pulses at a fixed rate such as one radio frequency pulse every five seconds, if no radio frequency pulse is received in over five seconds, it is determined that the personal transmitter 100 is out of range of the device 10 for detecting a being left within a vehicle 9. In this example, a timer is initialized 202 to zero, then a loop is entered checking if the radio frequency pulse was received 204. If the radio frequency pulse was received 204, the timer is re-initialized 202 and the loop continues. If the radio frequency pulse was not received 204, then a test 206 is made to determine if the timer has exceeded a threshold (e.g. when the radio frequency pulse are expected every five seconds, the threshold is, for example, six seconds to allow for tolerances of the personal transmitter 100). If the test 206 determines that the timer has not exceeded the threshold, the loop continues looking for radio frequency pulses or the timer exceeding the threshold.

If the test 206 determines that the timer has exceeded the threshold, the loop ends as it has now been determined that the personal transmitter 100 is distal from the device 10 for detecting a being left within a vehicle 9 as the signal strength of the radio frequency signal is too weak to detect or the signal strength of the radio frequency signal is lower than a predetermined signal strength value. As discussed prior, it is anticipated that the personal transmitter 100 transmit this radio frequency signal with a unique value encoded there within so that device 10 for detecting a being left within a vehicle 9 does not confuse a personal transmitter 100 from a different device 10 for detecting a being left within a vehicle 9 with the personal transmitter 100 for this device 10 for detecting a being left within a vehicle 9.

Now the being detection module 50 is turned on or enabled 208 and the being detection module 50 scans 210 the passenger compartment of the vehicle 9 to determine if there is movement within the passenger compartment of the vehicle 9 (e.g. breathing or any movement). If no movement is detected 212, the above steps are repeated, in some embodiments, after a delay is made to conserve power.

If movement is detected 212, the sound emitting device 30 is enabled 214 so that an alarm is made. The sound emitting device 30 remains on until a reset 216 is received by an operator pressing the reset switch 46. In some embodiments, the reset switch 46 needs to be pressed and held for a period of time to initiate the reset.

Figure 7:
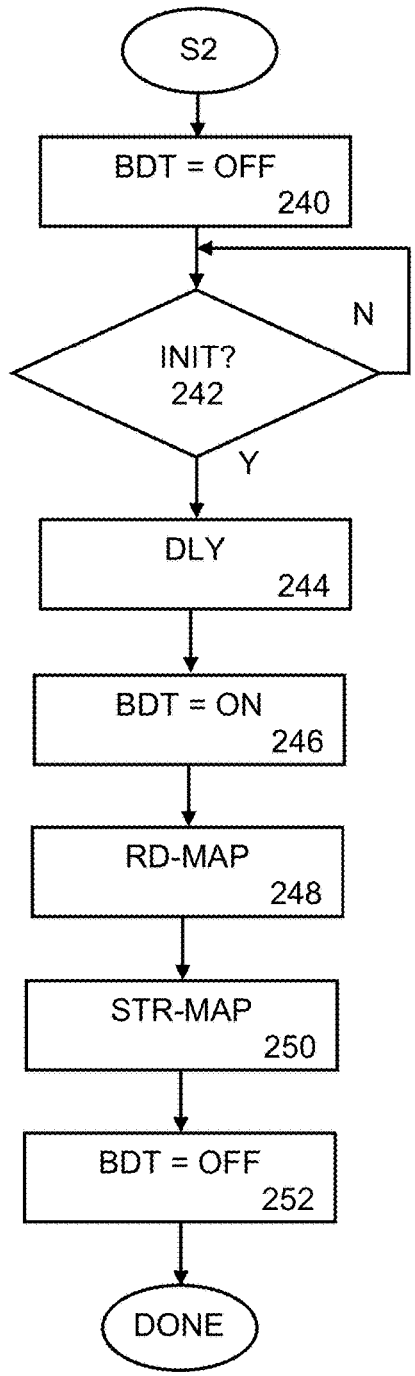
FIG. 7 illustrates a flow chart of the device for detecting a being left within a vehicle.

Referring to FIG. 7, a second flow chart of the device 10 for detecting a being left within a vehicle 9 is shown. This program flow typically operates one time when the device 10 for detecting a being left within a vehicle 9. When the device 10 for detecting a being left within a vehicle 9 is turned on, the being detection module 50 is turned off 240 to conserve power and a loop begins looking for an initialization signal 242, which is, for example, pressing the initialization button 48 (e.g. for a period of several seconds). Once the initialization signal 242 is detected, a delay is made 244 to allow the operator 8 to vacate the vehicle 9 and to close the door. In some embodiments, the optional piezo sounder 28 is used to signal the operator 8 that initialization will begin (e.g. constant beeps while the delay is made 244.

Now the being detection module 50 is turned on 246 and the being detection module 50 creates 248 a map of the passenger compartment of the vehicle 9 that is later used to determine if a being is present as detected 212 previously in FIG. 6. In some embodiments, while the being detection module 50 creates 248 the map, one or all of the optional LEDs 24/25/26/27 are illuminated so the operator 8 can see when the initialization process is complete and may enter the vehicle 9.

Once the map of the passenger compartment of the vehicle 9 is created 248, the map is stored 250 and the being detection module 50 is turned off 252, again to conserve power.

Figure 8A:
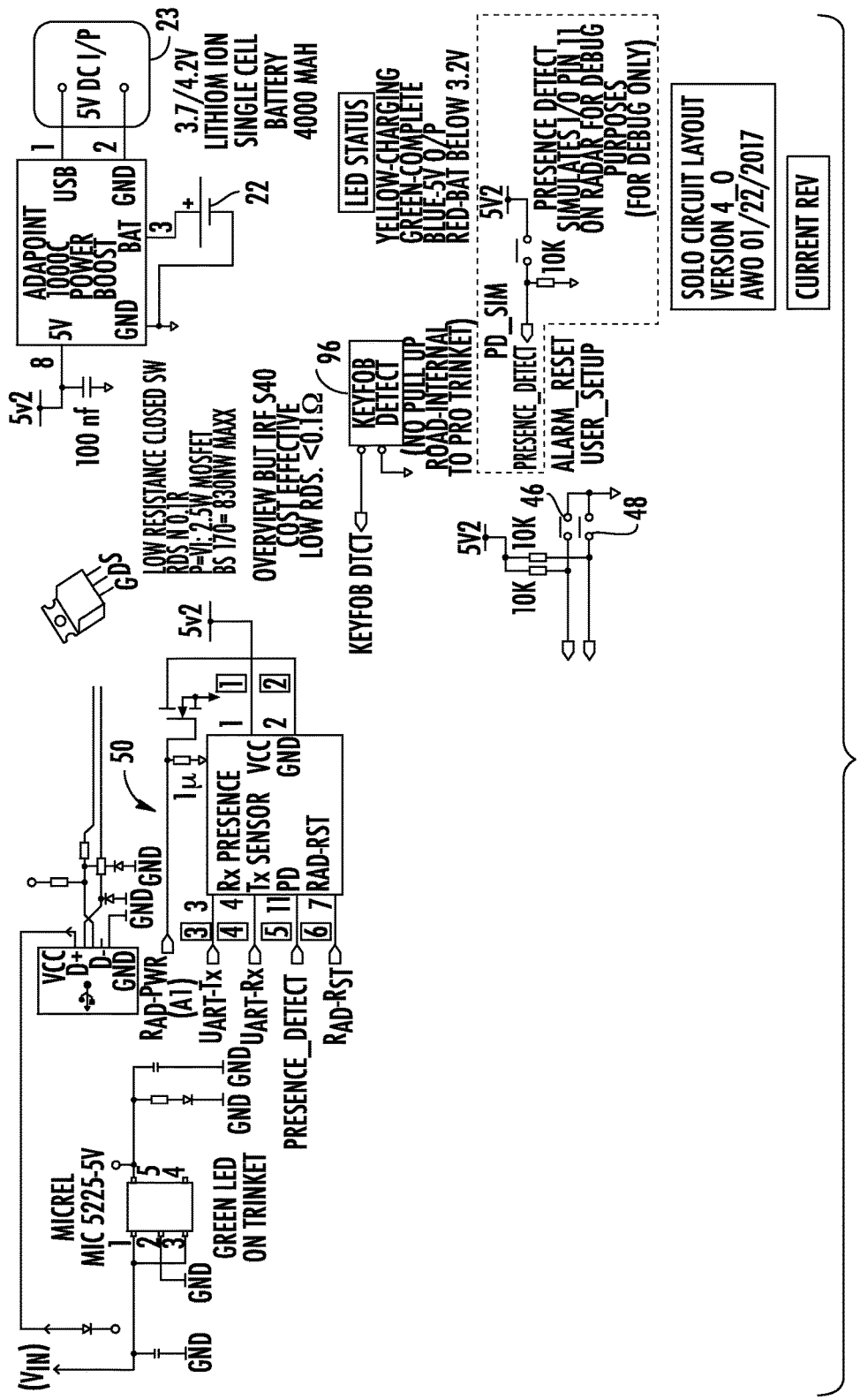
FIGS. 8A and 8B illustrate a schematic diagram of the device for detecting a being left within a vehicle.
Figure 8B:
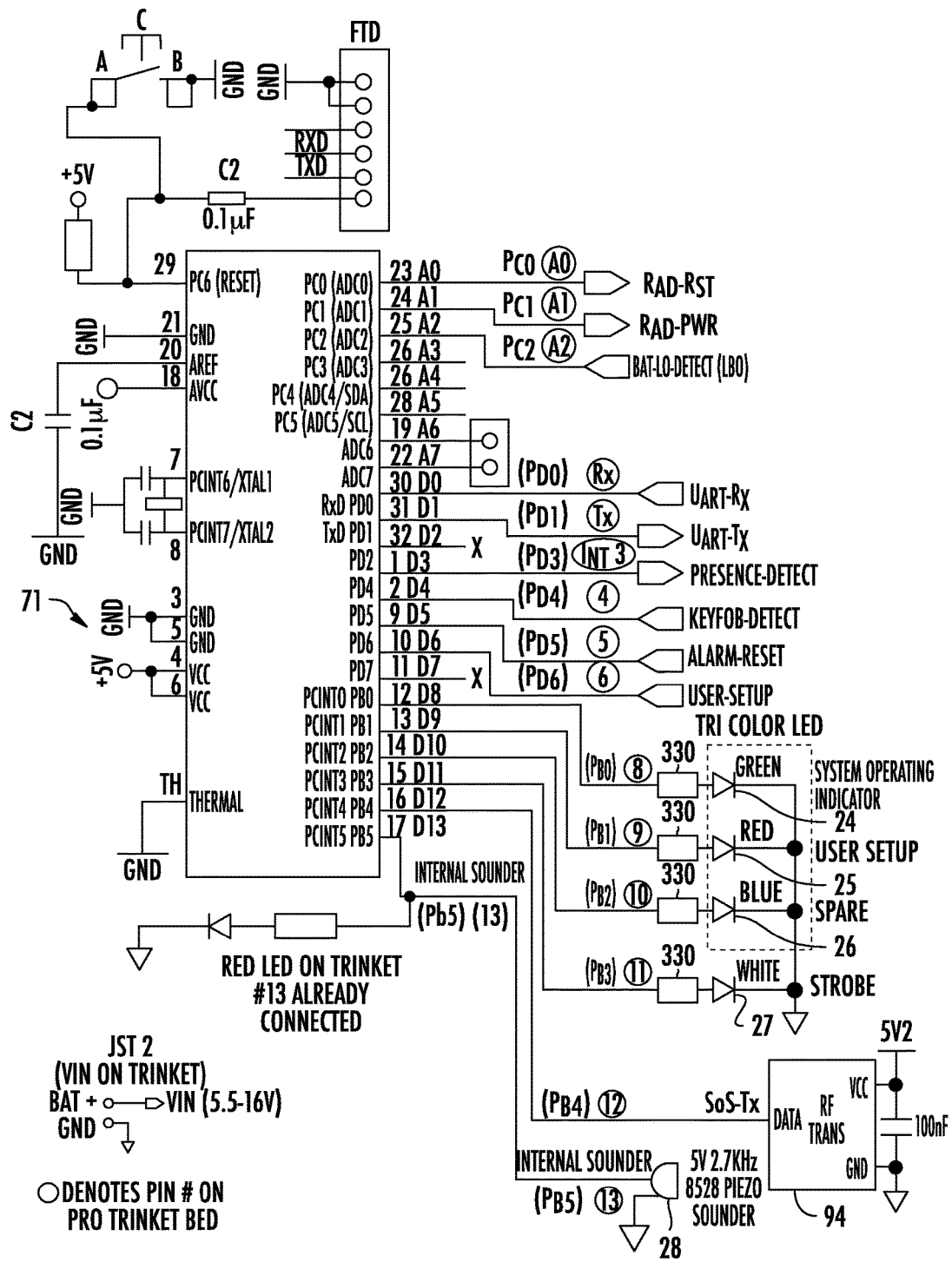

Referring to FIGS. 8A and 8B, a schematic diagram of the device 10 for detecting a being left within a vehicle 9 is shown. Shown is an exemplary electrical arrangement of interconnected components of the device 10 for detecting a being left within a vehicle 9, though the present invention is not limited in any way to any particular implementation.

The being detection module 50 interfaces to the processor 70 through input pins and output pins of the processor 70. Several LEDs 24/25/26/27 are interfaced to output pins of the processor 70 and are illuminated under software control. For example, three LEDs 24/25/26 are common (one light output) and illuminate yellow to indicate charging, green to indicate charged, blue to indicate power, and red to indicate low battery. In some embodiments, a fourth, white LED 27 is provided and is illuminated (e.g. blinking) when the sound emitting device 30 is emitting a sound (alarm) to inform others to which vehicle they need to pay attention as it may be difficult to determine the source of the alarm sound in a crowded parking lot.

In some embodiments, a piezo sounder 28 is provided and interfaced to an output pin of the processor 70 to emit sound within the passenger compartment of the vehicle 9. For example, the software enables the piezo sounder 28 periodically when the signal from the personal transmitter 100 is below the predetermined signal strength.

The radio frequency signal from the personal transmitter 100 is received from personal transmitter 100 on an antenna 98 (not shown in FIGS. 8A and 8B) and detected by the radio receiver 96. The radio receiver 96 determines that the personal transmitter 100 is away from the vehicle 9 (and hence, the operator 8 is away from the vehicle 9) by determining when the signal strength of the periodic radio frequency transmissions from the personal transmitter 100 falls below a predetermined signal strength. The radio receiver 96 and/or the processor 70 determine if the received radio frequency transmission is from a personal transmitter 100 associated with this device 10 for detecting a being left within a vehicle 9 (e.g. by serial number encoded in the radio frequency signal).

Another output pin from the processor 70 is interfaced to the Bluetooth transceiver 94 for wireless connection to the sound emitting device 30 or to a relay (not shown for clarity reasons) for wired connection to the sound emitting device 30.

As one embodiment of the device 10 for detecting a being left within a vehicle 9 includes an internal battery 22, such embodiments also include a connector 23 for charging (e.g. a micro-USB connector that receives power from a 5 volt power source).

Figure 9:
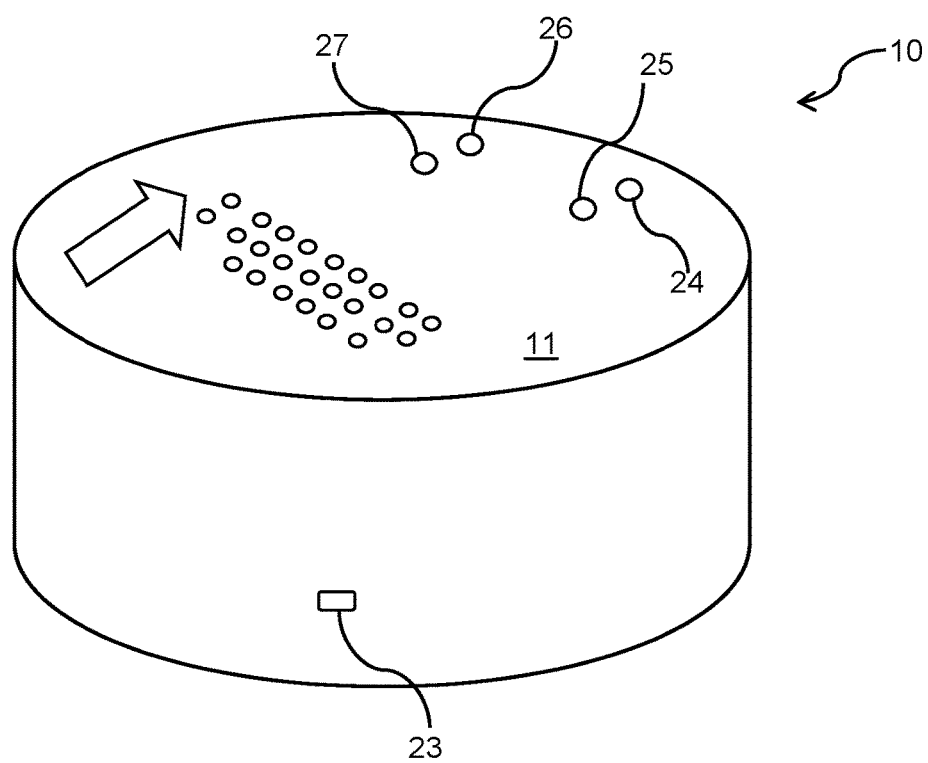
FIG. 9 illustrates an exemplary perspective view of the device for detecting a being left within a vehicle.

Referring to FIG. 9, an exemplary perspective view of the device 10 for detecting a being left within a vehicle 9 is shown. In this view, the LEDs 24/25/26/27 are shown on a surface of an enclosure 11 of the device 10 for detecting a being left within a vehicle 9 such that the LEDs 24/25/26/27 face downward when the device 10 for detecting a being left within a vehicle 9 is mounted on the roof of the vehicle 9, within the passenger compartment. Also shown is the connector 23 for charging the internal battery 22 (see FIGS. 8A and 8B). It is anticipated that the connector 23 for charging be connected to a car charger by a cable when the internal battery 22 needs charging and/or the device 10 for detecting a being left within a vehicle 9 be removed temporarily for charging from any source of power that is appropriate for connecting to the connector 23 for charging.

Figure 9A:
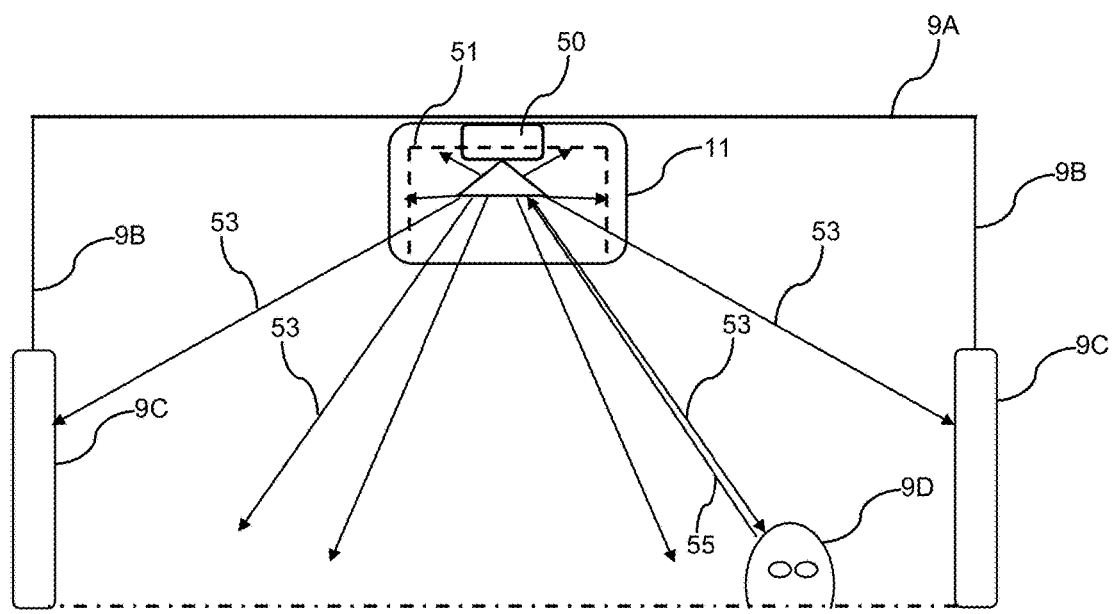
FIG. 9A illustrates a sectional view of a passenger cabin of a vehicle equipped with the device for detecting a being left within a vehicle.

Referring to FIG. 9A, a sectional view of a passenger cabin 9A/9B/9C of a vehicle equipped with the device for detecting a being left within a vehicle. For clarity, the passenger cabin 9A/9B/9C of the vehicle is shown partially (e.g. no seats, dash board, etc.).

As discussed previously, it is very important to reduce or eliminate false alarms as false alarms. People who might respond to the notable alarm cadence and aid the child tend to start ignoring the alarm when too many false alarms are heard.

Therefore, it is important that the device for detecting a being left within a vehicle properly detect a child 9D left within the vehicle 9A/9B/9C, but that a cat walking across the roof 9A of the vehicle 9A.9B/9C or a person walking next to the vehicle 9A/9B/9C do not initiate a false alarm. As shown in FIG. 9A, the enclosure 11 of the device for detecting a being left within a vehicle is mounted to the roof 9A of the vehicle 9A/9B/9C. Note that the vehicle 9A/9B/9C has windows 9B and, typically metal, doors/walls. Radio frequency pulses 53 emanate from the being detection module 50 and when, for example, a child 9D is within the vehicle, the radio frequency pulses 53 reflect as reflected pulses 55 from the child 9D.

The primary issue is that radio frequency pulses 53 emanating from the being detection module 50 are omnidirectional (as shown), meaning that, without additional controls, the radio frequency pulses 53 will exit the vehicle through the windows 9B and, possibly through the roof (for a short distance for a roof 9A made of metal and a greater distance for a roof 9A made of cloth or plastic). The radio frequency pulses 53 need to have sufficient power as to reach the smallest being (e.g. child 9D) that may be left in the vehicle 9A/9B/9C as the radio frequency pulses 53 attenuate at roughly the square of the distance. The problem is that, due to the proximity to the roof 9A and to the windows 9B, the radio frequency pulses 53 will make way outside of the vehicle 9A/9B/9C. For example, even if the roof 9A is made from metal, a cat crossing the roof 9A would trigger a false alarm.

To facilitate proper detection of a being (e.g. child 9D) while reducing or eliminating fall alarms from animals and humans external to the vehicle 9A/9B/9C, a partial Faraday shield 51 is formed around the being detection module 50. Faraday shields are known for other uses, usually to completely shield an object from the constant barrage of radio waves present in our atmosphere. For example, in testing an electronic device for radio frequency emissions, the electronic device and a radio frequency antenna are placed within a Faraday shield so that only radio frequency signals from the electronic device are received by the antenna, not external radio frequency signals.

This being said, it would not work to place the being detection module 50 within a Faraday shield as all radio frequency pulses 53 from the being detection module 50 would remain within the Faraday shield and not be capable of detecting the animals or humans. Instead, the being detection module 50 is placed within a partial Faraday shield 51. The partial Faraday shield allows radio frequency pulses 53 to reach areas within the vehicle 9A/9B/9C where the animal or human typically rests, but does not allow the radio frequency pulses 153 to exit the vehicle 9A/9B/9C, for example, through the roof 9A and windows 9B (note the short arrows emanating from the being detection module 50 do not reach the roof 9A and windows 9B). Note that attenuating the power output of the being detection module 50 has been attempted, but as the power is reduced to a level that the radio frequency pulses 53 do not significantly escape the vehicle 9A/9B/9C, detection of a human or animal within the vehicle fails.

Figure 10:
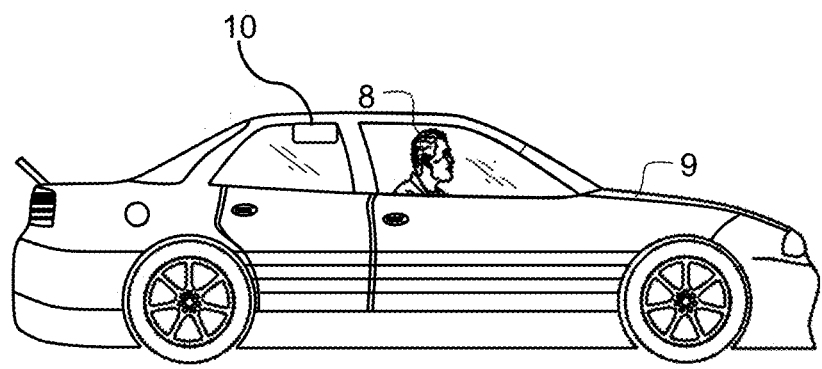
FIG. 10 illustrates a plan view of the exemplary device for detecting a being left within a vehicle mounted on the roof of the vehicle.

Referring to FIG. 10, a plan view of the exemplary device 10 for detecting a being left within a vehicle 9 mounted on the roof of the vehicle 9 is shown. As discussed previously, after mounting the device 10 for detecting a being left within a vehicle 9 to the roof of the passenger compartment of the vehicle 9, the operator 8 presses the initialization button 48 (e.g. holds the initialization button 48 for several seconds) until, in some embodiments, the piezo sounder 28 begins to beep, informing the operator 8 to vacate the vehicle 9 and close the doors. After the device 10 for detecting a being left within a vehicle 9 creates a map of the passenger compartment, in some embodiments, one or more of the LEDs 24/25/26/27 are illuminated to signal that the initialization process is complete. In some embodiments, the sound emitting device 30 is controlled to emit a short beep to signal that the initialization process is complete.

Although any mounting scheme is anticipated, in some embodiments, the device 10 for detecting a being left within a vehicle 9 is affixed to the roof of the vehicle 9 using hook and loop material for easy removal (e.g. for charging the device 10 for detecting a being left within a vehicle 9).

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A vehicle safety system comprising:
    means for detecting that an operator of the vehicle is away from the vehicle by more a distance greater than zero;

means for detecting movement within a passenger compartment of the vehicle, the means for detecting movement within the passenger compartment of the vehicle partially contained within a Faraday shield, thereby reducing detection of movement outside of the passenger compartment of the vehicle;

means for signaling an alarm;

responsive to the means for detecting the operator of the vehicle is away from the vehicle by the distance, the means for detecting movement within the passenger compartment of the vehicle scans the vehicle to determine if there is the movement within the vehicle; and if there is the movement within the vehicle, the means for signaling the alarm is activated to signal the alarm.

2. The vehicle safety system of claim 1, wherein the means for detecting the operator of the vehicle is away from the vehicle by more than the non-zero predetermined distance comprises a personal transmitter that periodically emits a radio frequency signal; when the personal transmitter is away from the vehicle by more than the non-zero predetermined distance, a signal strength of the radio frequency signal falls below a minimum signal strength indicating that the personal transmitter is away from the vehicle by more than the non-zero predetermined distance, and when the personal transmitter is away from the vehicle by less than the predetermined distance, the signal strength of the radio frequency signal is above the minimum signal strength indicating that the personal transmitter is closer to the vehicle by less than the predetermined distance.

3. The vehicle safety system of claim 1, wherein the means for detecting movement within the passenger compartment of the vehicle comprises an impulse radar transceiver.

4. The vehicle safety system of claim 3, wherein the movement detected by the impulse radar transceiver is less than one millimeter.

5. The vehicle safety system of claim 3, wherein the impulse radar transceiver detects movement of a child's breathing.

6. The vehicle safety system of claim 1, wherein the means for signaling the alarm is a sound emitting device external to the passenger compartment of the vehicle.

7. The vehicle safety system of claim 1, wherein the distance is between five feet and ten feet from the vehicle.

8. A vehicle safety system comprising:

a personal transmitter that periodically emits a radio frequency signal;

an enclosure mounted within a passenger compartment of a vehicle;

a receiver located within the enclosure, the receiver receiving and detecting the radio frequency signal;

a movement detector located within the enclosure, the movement detector and enclosure are within a passenger compartment of the vehicle, the movement detector is contained within a partial Faraday shield, thereby reducing emissions and reception of signals from outside of the passenger compartment of the vehicle;

the receiver attempts to detect the radio frequency signal for a period of time and, responsive to the personal transmitter being at a distance of at least five feet from the vehicle, the receiver does not detect the radio frequency signal for the period of time and then, responsive to such, the movement detector is operated to determine if there is movement within the vehicle; and if the movement detector detects a movement within the vehicle, an alarm is signaled.

9. The vehicle safety system of claim 8, wherein the receiver detects the radio frequency signal from the personal transmitter by a signal strength of the radio frequency signal being measured greater than a minimum signal strength that relates to the personal transmitter being within a distance of five to ten feet from the vehicle.

10. The vehicle safety system of claim 8, wherein the movement detector comprises an impulse radar transceiver.

11. The vehicle safety system of claim 10, wherein the movement detected by the impulse radar transceiver is less than one millimeter.

12. The vehicle safety system of claim 10, wherein the impulse radar transceiver detects movement of a child's breathing.

13. The vehicle safety system of claim 8, wherein the alarm is signaled by a sound emitting device external to the passenger compartment of the vehicle.

14. A method of vehicle safety comprising:

(a) within a vehicle, attempting to receive a radio frequency signal from a personal transmitter;

(b) upon not receiving the radio frequency signal for a predetermined period of time, indicative that the personal transmitter is further away from the vehicle by a distance of between five and ten feet:

(c) determining if there is movement within the vehicle using an impulse radar transceiver mounted within a partial Faraday shield, the partial Faraday shield reducing emission to an area outside of the vehicle and, therefore, reducing false alarms;

(d) if there is movement within the vehicle, sounding an alarm;

(e) waiting until a reset is received;

(f) stopping of the sounding of the alarm; and (g) repeating steps (a)-(f).

15. The method of claim 14, wherein the not receiving the radio frequency signal is determined if the radio frequency signal does not exceed a predetermined signal strength indicative that the personal transmitter is further away from the vehicle than between five and ten feet.

16. The method of claim 14, wherein the sounding of the alarm if performed by sending a wireless signal to a sound emitting device that is located under the hood of the vehicle.

17. The method of claim 16, wherein the sounding of the alarm is performed to emit sounds in a cadence of an international distress signal in Morse code (dot, dot, dot, dash, dash, dash, dot, dot, dot).

18. The method of claim 14, wherein the impulse radar transceiver detects the movement of less than one millimeter.

19. The method of claim 14, wherein the step (d) if there is the movement within the vehicle, sounding the alarm; further includes notifying though an interface to a cellular network.

* * * * *